(12) United States Patent
Stangier

(10) Patent No.: US 6,332,555 B1
(45) Date of Patent: Dec. 25, 2001

(54) FUEL TANK WITH OPENING CLOSED BY REMOVABLE HOLDING COVER AND SEALING RING

(75) Inventor: Oskar Stangier, Bonn (DE)

(73) Assignee: Kautex Textron GmbH & Co. KG., Bonn (DE)

(*) Notice: Subject to any disclaimer, the term of this patent is extended or adjusted under 35 U.S.C. 154(b) by 0 days.

(21) Appl. No.: 08/886,001

(22) Filed: Jun. 30, 1997

(30) Foreign Application Priority Data

Jul. 6, 1996 (DE) .............................................. 196 27 395

(51) Int. Cl.[7] .................................................... B65D 45/32
(52) U.S. Cl. ........................ 220/562; 220/4.14; 220/319; 220/378; 220/657
(58) Field of Search .................................. 220/601, 562, 220/604, 605, 639, 640, 641, 643, 319, 315, 378, 657, 4.14, 293, 295, 298, 86.2, DIG. 33, 644–646, 634, 661, 633, 616, 327; 215/274–276

(56) References Cited

U.S. PATENT DOCUMENTS

| | | | |
|---|---|---|---|
| 506,928 | * 10/1893 | Newman | 215/275 |
| 2,553,222 | * 5/1951 | Wallgren et al. | 220/378 X |
| 3,286,871 | * 11/1966 | Eberline | 220/4.14 |
| 3,289,879 | * 12/1966 | Williams | 220/378 |
| 3,696,962 | * 10/1972 | Fehres et al. | 220/378 X |
| 3,897,884 | * 8/1975 | Lankenau | 220/378 X |
| 4,267,940 | * 5/1981 | Wade | 220/378 X |
| 4,377,245 | * 3/1983 | Patty | 220/319 X |
| 4,457,445 | * 7/1984 | Hanks et al. | 220/319 X |
| 4,664,281 | * 5/1987 | Falk et al. | 220/378 X |
| 4,741,453 | * 5/1988 | Stolzman | 220/315 |
| 4,828,300 | * 5/1989 | Agbay | 220/319 X |
| 4,998,639 | 3/1991 | Seizert et al. . | |
| 5,050,764 | * 9/1991 | Voss | 220/378 |
| 5,678,721 | * 10/1997 | Catrigny et al. | 220/293 X |
| 5,704,510 | * 1/1998 | Feltman, III et al. | 220/293 |

FOREIGN PATENT DOCUMENTS

| | | | |
|---|---|---|---|
| 1051253 | * 2/1959 | (DE) | 220/319 |
| 29 36 773 | 4/1981 | (DE) . | |
| 31 35 982 A1 | 4/1983 | (DE) . | |
| 91 06 732 | 10/1991 | (DE) . | |
| 92 05 132 | 11/1992 | (DE) . | |
| 42 40 629 C2 | 12/1995 | (DE) . | |
| 44 34 561 A1 | 4/1996 | (DE) . | |
| 2 596 333 | 10/1987 | (FR) . | |
| 2 635 055 | 2/1990 | (FR) . | |
| 597282 | * 8/1959 | (IT) | 220/319 |

* cited by examiner

*Primary Examiner*—Joseph M. Moy
(74) *Attorney, Agent, or Firm*—Akin, Gump, Strauss, Hauer & Feld, L.L.P.

(57) ABSTRACT

A fuel tank for a motor vehicle has a connecting portion which extends around an opening in the tank wall which is closed by a holding cover, with the interposition of a sealing ring. The connection between the connecting portion and the holding cover is made by a fixing means urging the holding cover towards the connecting portion. The sealing ring is disposed in a groove in the connecting portion or the holding cover and the cross-sections of the groove and the sealing ring are so selected that, in its operative position of closing the opening, the holding cover is supported directly by the end surface of the connecting portion, bearing against that end surface.

20 Claims, 2 Drawing Sheets

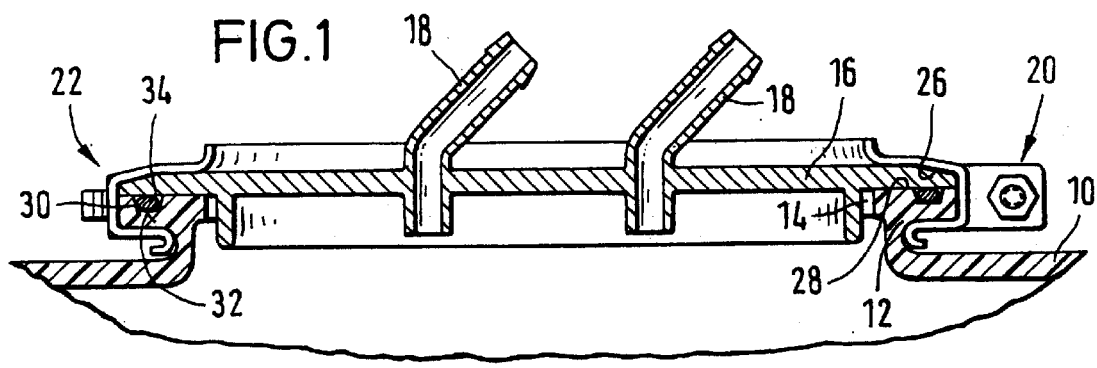
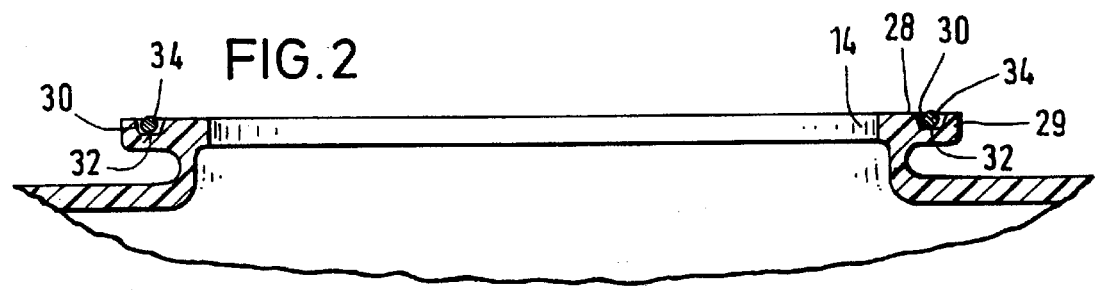
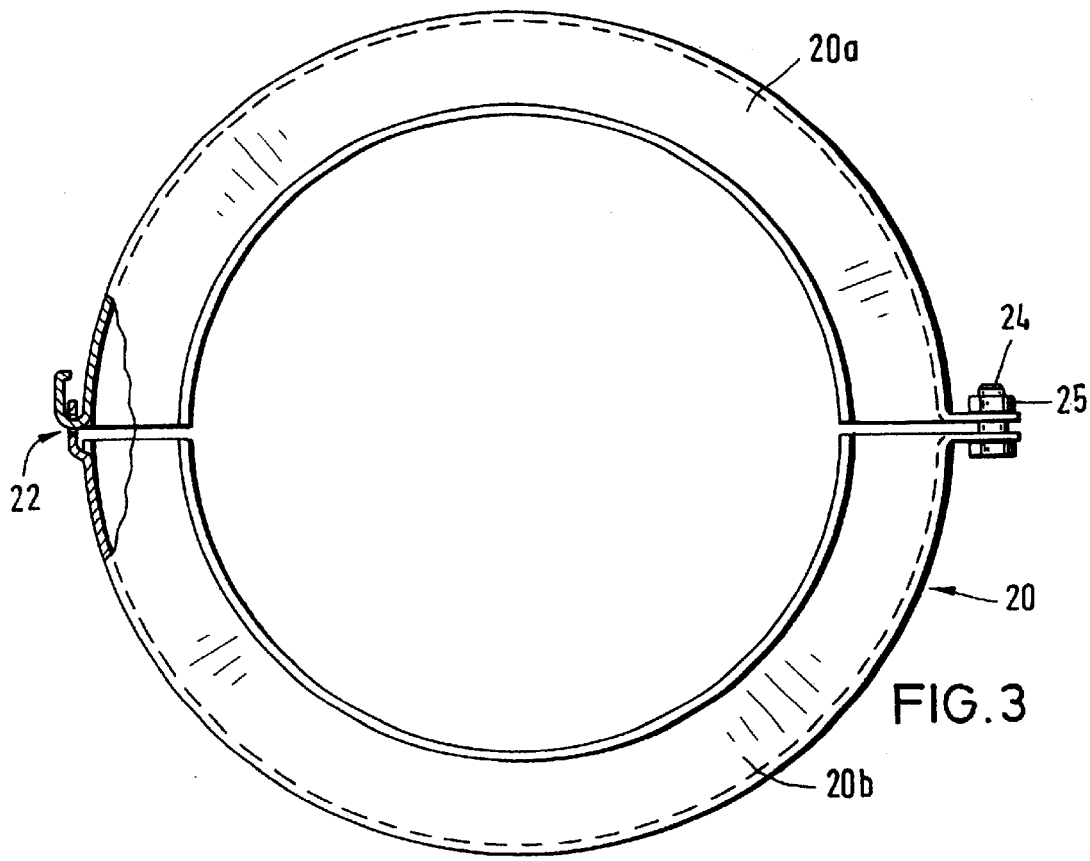

FUEL TANK WITH OPENING CLOSED BY REMOVABLE HOLDING COVER AND SEALING RING

FIELD OF THE INVENTION

The invention concerns a fuel tank, for example of thermoplastic material, for installation in a motor vehicle.

BACKGROUND OF THE INVENTION

One form of fuel tank comprising a thermoplastic material, for installation in a motor vehicle, comprises a connecting portion extending around an opening in the tank wall, with the opening being closed by a holding cover which is fitted on to the connecting portion and held thereon by a fixing means for urging the holding cover in a direction towards the connecting portion. The holding cover is provided for holding for example conduits or hoses, filling level indicator means, a pump or the like. A sealing ring which may be in the form of an O-ring is interposed between the holding cover and the connecting portion to which the holding cover is secured. In a fuel tank of that general design configuration, as is to be found in German patent specification No 42 40 629, the arrangement is such that the holding cover lies exclusively on the resilient sealing ring in order in that way to be able to apply contact pressing forces of different magnitudes and compensate for any manufacturing tolerances that may be present. In that arrangement the resilient sealing ring is a structural component of the connection between the tank and the holding cover. That however suffers from the disadvantage that the sealing ring is required to perform two functions, namely a sealing function on the one hand and on the other hand the function of a structural member for the transmission of forces, with the result that a variation in the position of the sealing ring, which can be caused for example by swelling or creep movement of the material forming it, as may occur for example due to the action of fuel thereon, may possibly also at the same time result in the configuration of the connection being affected.

Reference may also be made to German laid-open application (DE-OS) No 31 35 982 disclosing a fuel tank of thermoplastic material for motor vehicles, with a filling connection portion or filler neck, and a connecting support which is mounted thereto, for receiving the closure cap of the filler. In that case a sealing ring is arranged between the filler neck and the connecting support portion which is supported against a contact surface of the filler neck by way of the elastic sealing ring. In this case also the aim of the invention is to make use of the elasticity of the sealing ring to compensate for tolerances which may be caused by virtue of dimensional fluctuations and different coefficients of expansion so that this design also essentially suffers from the disadvantages already described above in connection with the fuel tank of German specification No 42 40 629.

SUMMARY OF THE INVENTION

An object of the present invention is to provide a fuel tank for a motor vehicle, which eliminates the disadvantages of the aboved-discussed tanks.

Another object of the present invention is to provide a fuel tank for a motor vehicle having a sealing ring between a connecting portion and a holding cover thereon, wherein the sealing ring does not have to perform any function as a structural member in order thereby to ensure that any effects on the sealing ring such as those of swelling or creep of the material forming same cannot adversely affect the connection between the fuel tank and the holding cover and thus the effectiveness of that connection.

Still another object of the present invention is to provide a fuel tank for installation in a motor vehicle having a connecting portion and a holding cover for fitting thereon and for carrying for example conduits, filling level indicators and/or pumps or like accessories, in which a sealing ring is operatively disposed between the connecting portion and the holding cover, wherein the components can be readily assembled in a simplified operating procedure.

In accordance with the principles of the present invention the foregoing and other objects are achieved by a fuel tank which more particularly for example comprises thermoplastic material for installation in a motor vehicle. The fuel tank comprises a tank body having a tank wall, with an opening in the tank wall. A connecting portion extends around the opening for receiving a holding cover which is adapted to close the connecting portion and the opening therein. The holding cover is provided for holding accessory components, for example conduits, filling level indicators, pumps and the like. A sealing ring is operatively interposed between the connecting portion and the holding cover and is preferably in the form of an O-ring. A fixing means is operative to urge the holding cover towards the connecting portion to hold the holding cover thereon. The sealing ring is arranged in a groove in the connecting portion or the holding cover, with the cross-section of the groove and the sealing ring being so selected that, in its operative position of closing the opening in the tank wall, the holding cover is supported directly by the outwardly facing end surface of the connecting portion, in a condition of bearing against that end surface.

As will be seen from embodiments of the invention which are described in greater detail hereinafter, to achieve the required sealing effect between the connecting portion and the holding cover, it will be necessary for the sealing ring, in the condition of not being loaded by the holding cover, to project towards the respective other part of the assembly, that is to say, when the groove is provided in the connecting portion on the fuel tank, then the sealing ring is required to project towards the holding cover, while when the groove is provided in the holding cover, the sealing ring must project towards the connecting portion. The depth of the groove or the depth of penetration into the groove of the undeformed sealing ring is thus to be so selected that it is less than the diameter or corresponding outside dimension of the sealing ring. In that connection however the cross-section of the groove must be of such a size that it can completely accommodate the sealing ring which is subjected to a pressure loading by the co-operation of the connecting portion and the holding cover, with corresponding cross-sectional deformation of the sealing ring, in order thereby to provide that on the one hand a condition of adequate sealing integrity is guaranteed while on the other hand the sealing ring does not represent a component of the load-bearing structure of the connecting configuration afforded by the connecting portion and the holding cover.

The fixing means for securing the holding cover in its operative position can be in the form of a clamping ring. It is however also possible to position on the connecting portion, a holding ring of a push-in closure arrangement in the manner of a bayonet closure arrangement, the holding ring co-operating with a clamp ring which engages over the holding cover at its peripheral edge and urges it towards the end surface of the connecting portion on the tank wall.

Another possible design configuration provides that the connecting portion is provided on its outside with a screwthread, on to which can be screwed a union nut, an edge region thereof engaging over the edge region of the holding cover.

At any event it should be possible for the holding ring which for example can carry accessory components such as filling level indicators, delivery conduits or hoses, pump devices or the like which are arranged in or which lead into the fuel tank, to be mounted to the fuel tank in a given orientation in respect of its peripheral position and to be connected in that position to the fuel tank in order thus to ensure that the components which are mounted on the holding cover or connected thereto are in a defined arrangement relative to the tank. That can be achieved in the usual manner by the provision on the connecting portion, the fixing means and the holding cover, of means which produce a positively locking engagement therebetween and which permit the co-operating parts of the assembly to be fitted or installed only in predetermined positions relative to each other in order thereby to ensure that a fuel pump, a filling level indicator and other devices and components assume within the fuel tank a given position which can be readily reproduced again, even after the connection between the holding cover and the fuel tank has been disconnected, when that connection is restored.

Further objects, features and advantages of the invention will be apparent from the following description of preferred embodiments thereof.

BRIEF DESCRIPTION OF THE DRAWING

FIG. 1 is a view in cross-section through the connecting portion of a fuel tank with a holding cover which is arranged thereon and held in position by a clamping ring, FIG. 2 shows the structure of FIG. 1 without the holding cover, FIG. 3 is a plan view of the clamping ring, partly in section.

DESCRIPTION OF PREFERRED EMBODIMENTS

Figure 4:
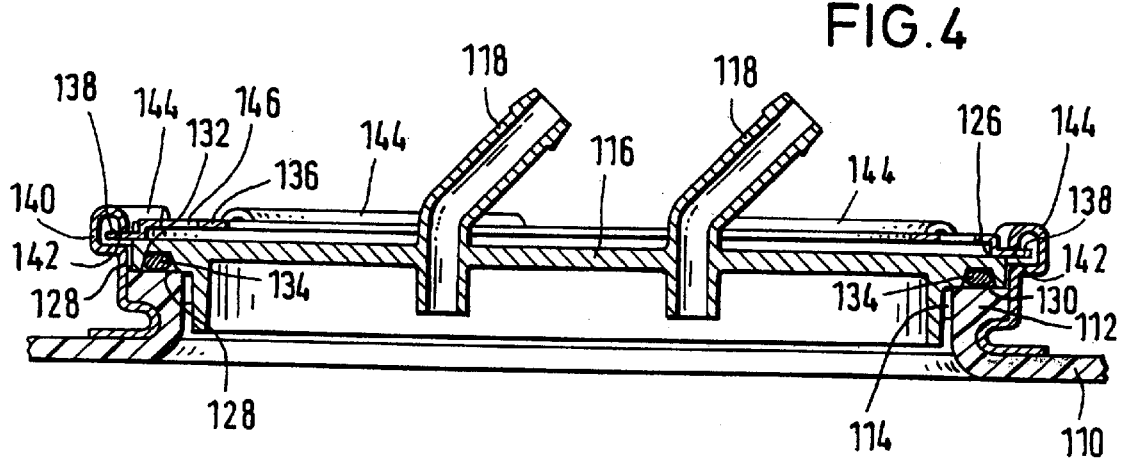
FIG. 4 is a view corresponding to FIG. 1 of a second embodiment in which the fixing means is designed in the manner of a bayonet closure.

Referring firstly to FIG. 1, shown therein is a part of a fuel tank 10 which (in particular for example) comprises thermoplastic material and which is intended for installation in a motor vehicle. The tank 10 has a tank body with a wall of which part is shown in FIG. 1, carrying an outwardly projecting connecting portion 12 which extends around and defines an opening 14 through the tank wall. A fuel tank of that kind is generally produced by a blow molding procedure from suitable thermoplastic material, with the connecting portion 12 initially being closed at its free end. The opening 14 is normally produced by a particular cutting operation.

The opening 14 and the connecting portion 12 therearound are closed by a holding cover 16 which usually comprises a different material from the fuel tank 10. The holding cover 16 may comprise a metal material, but it may possibly also be made from a plastic material which differs from the plastic material of the fuel tank 10, by virtue of being of greater hardness. Blow-molded fuel tanks of plastic material are generally made from a polyolefin.

In the embodiments illustrated in the drawing the holding cover 16 serves to held various accessory components and is illustrated as carrying conduit portions 18, by means of which a connection is made between the interior of the fuel tank 10 and the outside atmosphere. Those conduit portions 18 may be parts of delivery conduits or hoses or other devices which are arranged within the fuel tank 10 and which require junctions disposed outside the fuel tank 10.

In the embodiment illustrated in FIGS. 1 and 2, the connection between the holding cover 16 and the connecting portion 12 of the fuel tank 10 is made by means of a two-part clamping ring 20. The two parts of the clamping ring 20 are indicated at 20a and 20b in FIG. 3, from which it will be seen that each part 20a, 20b constitutes, substantially a respective half of the clamping ring 20. The two parts 20a, 20b of the clamping ring 20 can be connected together and braced together by way of a hook-type connection as indicated at 22, which permits a pivotal movement between the two parts 20a, 20b, and a screwthreaded bolt 24 with nut 25, the bolt 24 and nut 25 being positioned at 180° displacement relative to the hook connection 22. It will be seen from FIG. 1 that the profile of the clamping ring 20 is such that it defines two limbs which spread apart somewhat in a radially inward direction from the outer edge of the clamping ring 20, while the edge region 26 of the holding cover 16, which co-operates with the limbs of the clamping ring 20, is correspondingly bevelled or inclined so that, when the screw connection of the bolt 24 and the nut 25 is tightened, a force component extending substantially parallel to the axis of the connecting portion 12 takes effect, by which the holding cover 12 is urged against the outwardly facing end surface 28 of the connecting portion 12. It will be seen from FIGS. 1 and 2 that the connecting portion 12 has an outwardly projecting flange-like rim portion 29 to stiffen the outwardly facing end surface 28 and to increase the area thereof.

At its end surface the connecting portion 12 is provided with a peripherally extending groove 30 therein, the cross-section of which uniformly decreases or tapers from the end surface 28 towards the bottom of the groove 30. The groove 30 serves to receive a sealing ring 34 whose cross-sectional dimensions, in relation to the depth of the groove 30, are so selected that on the one hand, in the non-loaded condition thereof, the sealing ring 34 projects upwardly somewhat beyond the end surface 28, as shown in FIG. 2, while on the other hand the cross-section of the sealing ring 34 is not greater than that of the groove 30 so that, in the operative position of the components as shown in FIG. 1, in which the holding cover 16 lies on and bears against the end surface 28 of the connecting portion 12, the sealing ring 34 is completely accommodated in the groove 30. The cross-section of the groove 30 may be somewhat larger than that of the sealing ring 34. The important consideration is that, due to the holding cover 16 being seated on and in contact with the end surface 28, the sealing ring 34 experiences elastic deformation and thus a prestressing effect which is adequate to produce a condition of sealing integrity which is such as to satisfy all requirements arising in practical operation. On the other hand the elastic deformation that the sealing ring 34 experiences under the effect of the holding cover bearing thereagainst when fitted on to the end surface 28 of the connecting portion 12 is too slight that it could involve a significant transmission of forces, as the holding cover 16 bears with its edge region over a surface area thereof against the end surface 28 of the connecting portion 12. With this arrangement therefore the sealing ring 34 is not a part of the load-bearing structure of the connection between the connecting portion 12 and the holding cover 16.

Referring now to FIG. 4, the embodiment illustrated therein is Identical in terms of the basic arrangement of its essential parts to the embodiment shown in FIGS. 1 through 3 so that the same components are also denoted by the same references but increased in FIG. 4 in each case by 100.

In the FIG. 4 embodiment the holding cover 116 is fixed on the connecting portion 112 using a clamp ring 136 which is provided in an outer edge region thereof with projection portions 138 co-operable with a holding ring 40 which is fixedly mounted on the connecting portion 112 on the outside thereof. The clamp ring 136 and the holding ring 140 co-operate in the usual fashion in the manner of a bayonet closure. The projecting portions 138 of the clamp ring 136, in the course of a rotary movement of the latter, are brought into engagement with the guide surface 142 of the respective holding portion 144 on the holding ring 140, in which case, by virtue of suitable inclination of the guide surfaces 142 in the peripheral direction, the co-operating parts are clamped together in the course of the rotary movement in the usual way. The rotary movement can be produced using a suitable tool, for the engagement of which openings 146 are provided in the clamp ring.

A further difference in the FIG. 4 embodiment, in comparison with the embodiment of FIGS. 1 through 3, is that the groove 130 for accommodating the sealing ring 134 is provided in the holding cover 136. In other respects the conditions already set forth in connection with the embodiment of FIGS. 1 through 3 also apply here so that in this case also the edge region of the holding cover 116 bears directly against the end surface 128 of the connecting portion 112 and the sealing ring 134 is not a part of the load-bearing structure of the connection between the connecting portion 112 and the holding cover 116.

It will be appreciated that in regard to this construction, as for all other embodiments described herein, the invention permits a simple connection to be quickly made between the fuel tank and the holding cover, and that connection on the one hand remains operative over a prolonged period of time while on the other hand if required, for example in the event of repair, it can be quickly released and also restored.

Figure 5:
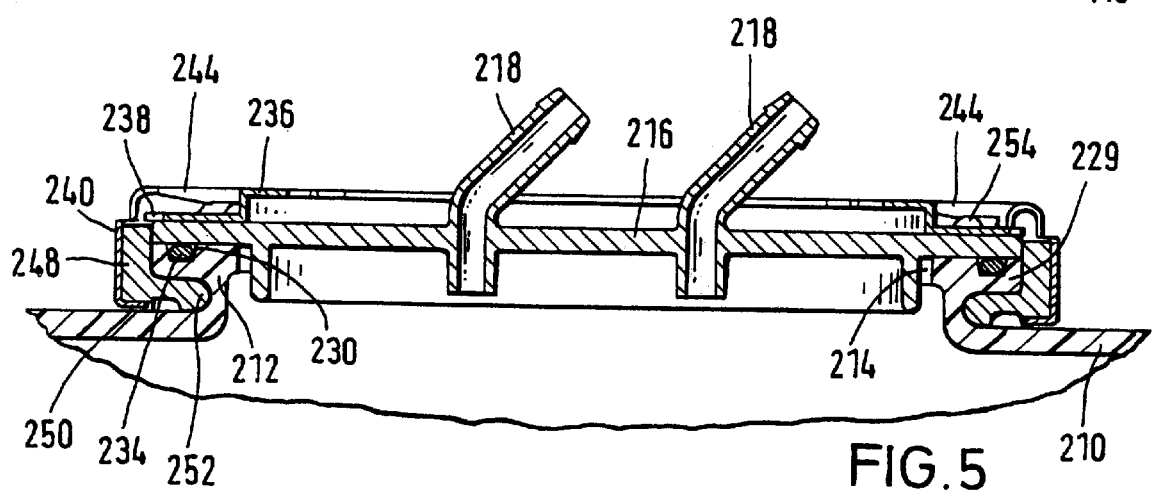
FIG. 5 is a view corresponding to FIG. 4 of a further embodiment of the invention with a bayonet closure.

Referring now to FIG. 5 the embodiment illustrated therein is the same in terms of its essential parts to that shown in FIGS. 1 through 3 so that identical components are denoted by the same references but increased by 200. One difference here is that the sealing ring 234 in the FIG. 5 embodiment is arranged in a groove 230 at the end surface of the connecting portion 212. In this construction also, similarly to FIG. 4 embodiment, the sealing ring could be arranged in the holding cover 216, as conversely in the FIG. 4 embodiment the groove for the sealing ring could be in the end surface of the connecting portion. In many cases arranging the groove for receiving the sealing ring in the connecting portion on the fuel tank will be preferable as the connecting portion must in any case be of the minimum thickness required for the purposes of affording an adequate degree of rigidity, whereas when the groove is arranged in the holding cover, it may under some circumstances possibly be necessary, for that purpose, for the holding cover to be thicker at least in the region having the groove, than would otherwise be necessary if no groove were provided there.

A further difference between the embodiment of FIGS. 1 through 3 and the FIG. 5 embodiment is that the FIG. 5 construction additionally has a fitting ring 248 which embraces the connecting portion 212 on the outside and engages under the flange-like outer rim portion 229 thereof. That fitting ring 248 which is produced separately and is divided or is otherwise suitably designed in such a way that it can be bent open in order to be passed around the connecting portion 212 only serves to simplify the configuration of the holding ring 240 for the bayonet closure. It will be noted that FIG. 4 shows that adaptation of the holding ring 140 to the external profiling of the connecting portion 112 requires a plurality of shaping procedures which to a certain extent are expensive. Admittedly, the divided fitting ring 28 also has to be adapted, in terms of its internal definition, to the external profile of the connecting portion 212. That however does not involve an increase in expenditure when manufacturing the fitting ring 248 for example by means of an injection molding process. On the other hand, the fitting ring 248 can be of such a definition on its outside that it is substantially flat-surfaced and accordingly only involves a low level of shaping expenditure for the holding ring 240 which can be provided at the side towards the body of the fuel tank 210 with an inwardly bent-over flange portion 250. The flange portion 250 engages under the fitting ring 248 so that the holding ring 240 is connected to the fitting ring 248 in positively locking engagement therewith. The fitting ring 248 is of L-shaped cross-section, wherein the limb 252 of the fitting ring 248, which engages behind the flange-like rim 229 of the connecting portion 212, produces an effective positively locking engagement between the fitting ring 248 and the connecting portion 212 so that the holding ring 240 is at any event held in its operative position in spite of the absence of direct contact with the connecting portion 212.

The use of a fitting ring 248 of that kind will depend on whether it is more expensive to produce such a fitting ring or to use a holding ring which, like that shown in FIG. 4, must involve a plurality of shaping steps. The fitting ring is advantageously made from a plastic material which is harder than the plastic material constituting the fuel tank.

To secure the clamp ring 236 in the clamping position on the projection portions 238 the clamp ring 236 has projections 254 which, at the end of its rotary movement that provides the firm connection between the holding cover 216 and the fuel tank 210, engage into corresponding openings on the holding ring 240 and in that way provide for an additional positively locking engagement which can only be disengaged by applying a minimum force acting in the opposite direction to the rotary movement for making the connection. Such projections 254 and the above-mentioned openings for receiving same may obviously also be provided in the embodiment shown in FIG. 4.

Figure 6:
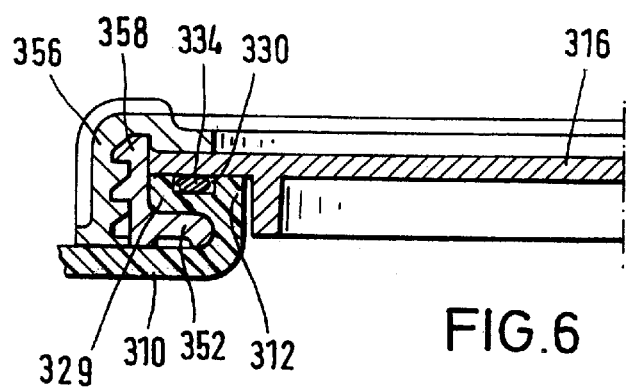
FIG. 6 is a view corresponding to FIG. 1 of a fourth embodiment of the invention.

Reference will now be made to FIG. 6 showing an embodiment in which those parts that are identical to those of the embodiment of FIGS. 1 through 3 are denoted by the same references but increased by 300. Here the connection between the holding cover 316 and the connecting portion 312 of the fuel tank 310 is made by means of a union or cap nut 356 which is screwed on to a male screwthreaded ring 358 which is arranged on the connecting portion 312 on the outside thereof and extending therearound, and which is of a similar configuration to the fitting ring 248 of the embodiment of FIG. 5. The limb 352 of the screwthreaded ring 358 engages behind the flange-like outer rim 329 of the connecting portion 312, which is provided in its end surface with the groove 330 for receiving the sealing ring 334. The screwthreaded ring 358 is also of a divided design in such a way that it can be bent open somewhat in order to pass it over the connecting portion 312 and move it into the operative position shown in FIG. 6. The screwthreaded ring 358 and the union nut 356 can be made from plastic material which however should be harder than the material of the fuel tank 10. As a departure from the other embodiments described above the construction shown in FIG. 6 is provided with a groove 330 which is approximately rectangular in cross-sectional configuration.

It will be appreciated that the above-described embodiments of the invention have been set forth solely by way of example and illustration of the principles thereof and that various other modifications and alterations may be made therein without thereby departing from the spirit and scope of the present invention.

What is claimed is:

1. A fuel tank for installation in a motor vehicle, comprising:
    a tank body having a tank wall, the tank wall having an opening therein,
    a connecting portion on the tank wall extending around the opening and having an end surface,
    a holding cover means for closing the connecting portion and therewith the opening therein,
    wherein the end surface of the connecting portion has a groove therein,
    a sealing ring operatively interposed between the connecting portion and the holding cover means and arranged in said groove, said
    a fixing means for urging the holding cover means towards said connecting portion for closing the same and said opening,
    wherein the cross-sections of the groove and the sealing ring are so selected that in its operative position of closing the connecting portion and the opening, the holding cover means is supported directly by said end surface of the connecting portion in a condition of bearing against said end surface, said seal ring being dimensioned solely for sealing without acting as structural member supporting said holding cover means; and
    wherein the cross-section of the groove accomodating the sealing ring tapers from the open side of the groove towards the lowest part of the groove.

2. A fuel tank as set forth in claim 1 comprising a thermoplastic material.

3. A fuel tank for installation in a motor vehicle, comprising:
    a tank body having a tank wall, the tank wall having an opening therein,
    a connecting portion on the tank wall extending around the opening and having an end surface,
    a holding cover means for closing the connecting portion and therewith the opening therein,
    wherein the end surface of the connecting portion has a groove therein,
    a sealing ring operatively interposed between the connecting portion and the holding cover means and arranged in said groove, and
    a fixing means for urging the holding cover means towards the connecting portion for closing the same and said opening, wherein the cross sections of the groove and the sealing ring are so selected that in its positive position of closing the connecting portion and the opening, the holding cover means is supported directly by said end surface of the connecting portion in a condition of bearing against said end surface, said seal ring being dimensioned solely for sealing without acting as a structural member supporting said holding cover means;
    wherein the connecting portion has an outwardly directed edge portion forming a flange and
    wherein the fixing means including a clamping ring which engages behind the said edge projection on the connecting portion and engages over the holding cover means at its edge thereby to urge it against the end surface of the connecting portion.

4. A fuel tank as set forth in claim 1
    wherein the cross-section of the groove accommodating the sealing ring tapers from the open side of the groove towards the lowest part of the groove.

5. A fuel tank for installation in a motor vehicle, comprising:
    a tank body having a tank wall, the tank wall having an opening therein,
    a connecting portion on the tank wall extending around the opening and having an end surface,
    a holding cover means for closing the connecting portion and therewith the opening therein,
    wherein the end surface of the connecting portion has a groove therein,
    a sealing ring operatively interposed between the connecting portion and the holding cover means and arranged in said groove, and
    a fixing means for urging the holding cover means towards the connecting portion for closing the same and said opening,
    wherein the cross-sections of the groove and the sealing ring are so selected that in its operative position of closing the connecting portion and the opening, the holding cover means is supported directly by said end surface of the connecting portion in a condition of bearing against said end surface, said seal ring being dimensioned solely for sealing without acting as a structural member supporting said holding cover means;
    a holding ring fitted on to the connection portion, and
    a clamp ring adapted to be substantially axially introduced into the holding ring and co-operable therewith and rotatable relative thereto, the clamp ring in its operative position engaging over the holding cover means at its edge thereto to urge it under pressure towards the end surface of the connecting portion.

6. A fuel tank as set forth in claim 1
    wherein the connecting portion has an outwardly directed edge portion forming a flange and
    wherein the fixing means includes a clamping ring which engages behind the said edge projection on the connecting portion and engages over the holding cover means at its edge thereby to urge it against the end surface of the connecting portion.

7. A fuel tank for installation in a motor vehicle, comprising:
    a tank body having a tank wall, the tank wall having an opening therein,
    a connecting portion on the tank wall extending around the opening and having an end surface,
    a holding cover means for closing the connecting portion and therewith the opening therein,
    wherein the end surface of the connecting portion has a groove therein,
    a sealing ring operatively interposed between the connecting portion and the holding cover means and arranged in said groove, and
    a fixing means for urging the holding cover means towards the connecting portion for closing the same and said opening, wherein the cross-sections of the groove and the sealing ring are so selected that in its operative position of closing the connecting portion and the opening, the holding cover means is supported directly by said end surface of the connecting portion in a condition of bearing against said end surface, said seal ring being dimensioned solely for sealing without acting as a structural member supporting said holding cover means;

wherein the connecting portion has an outer edge portion and including a divided fitting ring disposed around the connecting portion and having a portion projecting radially inward between the outer edge portion of the connecting portion and the tank wall to engage the connecting portion and a holding ring supported on the fitting ring.

8. A fuel tank or installation in a motor vehicle, comprising:

a tank body having a tank wall, the tank wall having an opening therein, a connecting portion on the tank wall extending around the opening and having an end surface, a holding cover means for closing the connecting portion and therewith the opening therein, wherein the end surface of the connecting portion has a groove therein, a sealing ring operatively interposed between the connecting portion and the holding cover means and arranged in said groove, and a fixing means for urging the holding cover means towards the connecting portion for closing the same and said opening, wherein the cross-sections of the groove and the sealing ring are so selected that in its operative position of closing the connecting portion and the opening, the holding cover means is supported directly by said end surface of the connecting portion in a condition of bearing against said end surface, said seal ring being dimensioned solely for sealing without acting as a structural member supporting said holding cover means;

wherein the connecting portion is provided on the outside with a screw thread and including a union nut screwed on to the connecting portion, over the holding cover means, to urge the holding cover means towards the end surface of the connecting portion.

9. A fuel tank as set forth in claim 8
wherein the holding ring is of metal.

10. A fuel tank for installation in a motor vehicle, comprising:

a tank body having a tank wall, the tank wall having an opening therein, a connecting portion on the tank wall extending around the opening and having an end surface, a holding cover means for closing the connecting portion and therewith the opening therein, wherein the end surface of the connecting portion has a groove therein, a sealing ring operatively interposed between the connecting portion and the holding cover means and arranged in said groove, and a fixing means for urging the holding cover means towards the connecting portion for closing the same and said opening, wherein the cross-sections of the groove and the sealing ring are so selected that in its operative position of closing the connecting portion and the opening, the holding cover means is supported directly by said end surface of the connecting portion in a condition of bearing against said end surface, said seal ring being dimensioned solely for sealing without acting as a structural member supporting said holding cover means; and wherein at least the connecting portion and the holding cover means are provided with means which afford a positively locking engagement and which provide for a given orientation of the holding cover means in respect of its angular position in the peripheral direction.

11. A fuel tank as set forth in claim 1
wherein the connecting portion is provided on the outside with a screw thread and including a union nut screwed on to the connecting portion, over the holding cover means, to urge the holding cover means towards the end surface of the connecting portion.

12. A fuel tank for installation in a motor vehicle, comprising:

a tank body having a tank wall, the tank wall having an opening therein, a connecting portion on the tank wall extending around the opening and having an end surface, a holding cover means for closing the connecting portion and therewith the opening therein, wherein the end surface of the connecting portion has a groove therein, a sealing ring operatively interposed between the connecting portion and the holding cover means and arranged in said groove, and a fixing means for urging the holding cover means towards the connecting portion for closing the same and said opening, wherein the cross-sections of the groove and the sealing ring are so selected that in its operative position of closing the connecting portion and the opening, the holding cover means is supported directly by said end surface of the connecting portion in a condition of bearing against said end surface, said seal ring being dimensioned solely for sealing without acting as a structural member supporting said holding cover means; and wherein the holding cover means contacts and is supported directly by the end surface of the connecting portion on both sides of the groove.

13. A fuel tank for installation in a motor vehicle, comprising:

a tank body having a tank wall, the tank wall having an opening therein, a connecting portion on the tank wall extending around the opening and having an end surface, a holding cover means for closing the connecting portion and therewith the opening therein, wherein the end surface of the connecting portion has a groove therein, a sealing ring operatively interposed between the connecting portion and the holding cover means and arranged in said groove, and a fixing means for urging the holding cover means towards the connecting portion for closing the same and said opening, wherein the cross-sections of the groove and the sealing ring are so selected that in its operative position of closing the connecting portion and the opening, the holding cover means is supported directly by said end surface of the connecting portion in a condition of bearing against said end surface, said seal ring being dimensioned solely for sealing without acting as a structural member supporting said holding cover means;

wherein the groove has a radial cross-section with a cross-sectional area and a depth;

wherein the sealing ring as a radial cross-section with a cross-sectional area and a cross-sectional diameter perpendicular to a plane defined by the sealing ring;

wherein the cross-sectional diameter of the sealing ring is greater than the depth of the groove in the connecting portion, and wherein the cross-sectional area of the sealing ring is less than the cross-sectional area of the groove and the sealing area ring is sufficiently deformable to be fully received within the groove.

14. A fuel tank for installation in a motor vehicle, comprising;
a tank body having a tank wall, the tank wall having an opening therein,
a connecting portion on the tank wall extending around the opening and having an end surface,
a holding cover means for closing the connecting portion and therewith the opening therein,
wherein the end surface of the connecting portion has a groove therein,
a sealing ring operatively interposed between the connecting portion and the holding cover means and arranged in said groove, and
a fixing emans for urging the holding cover means towards the connecting portion for closing the same and said opening,
wherein the cross-sections of the groove and the sealing ring are so selected that in its operative position of closing the connecting portion and the opening, the holding cover means is supported directly by said end surface of the connecting portion in a condition of bearing against said end surface, said seal ring being dimensioned solely for sealing without acting as a structural member supporting said holding cover means; and
wherein the fixing means generates surface contact loads between the holding cover means and the connecting portion, the loads being fully supported by the holding cover means and connecting portion in direct contact with one another.

15. A fuel tank as set forth in claim 1
wherein the groove has a radial cross-section with a cross-sectional area and a depth;
wherein the sealing ring has a radial cross-section with a cross-sectional area and a dimension perpendicular to a plane defined by the sealing ring;
wherein the cross-sectional diameter of the sealing ring is greater than the depth of the groove in the connecting portion; and
wherein the cross-sectional area of the sealing ring is less than the cross-sectional area of the groove and the sealing ring is sufficiently deformable to be fully received within the groove.

16. A fuel tank as set forth in claim 1
wherein the fixing means generates surface contact loads between the holding cover means and the connecting portion, the loads being fully supported by the holding cover means and connecting portion in direct contact with one another.

17. A fuel tank as set forth in claim 14 comprised of thermoplastic material and further comprising:
an outer edge portion extending radially outward from the connecting portion at the end surface forming a flange, the flange-defining a part of the end surface of the connecting portion; and
a divided ring having a portion engaging said outer edge portion of the connecting portion and having an outer periphery and a screw thread on the outer periphery.

18. A fuel tank as set forth in claim 17 further comprising a union nut screwed on to the divided ring and over the holding cover means at an edge of the holding cover means so as to urge the holding covered means towards the end surface of the connection portion.

19. A fuel tank for installation in a motor vehicle, comprising:
a tank body having a tank wall, the tank wall having an opening therein,
a connecting portion on the tank wall extending around the opening and having an end support surface,
a holding cover means for mounting at least one accessory component and for closing the connecting portion and therewith the opening therein, the holding cover means having a support surface co-operating with said end surface when said holding cover means is in the operative position of closing the connecting portion and the opening,
wherein one of the connecting portion and the holding cover means has a groove therein extending in an annular configuration therearound in the respective support surface,
a sealing ring operatively interposed between the connecting portion and the holding cover means and arranged in said groove, and
a fixing means for urging the holding cover means towards the connecting portion for closing same and said opening,
wherein the cross-sections of the groove and the sealing ring are so selected that in an operative position of closing the connecting portion and the opening, the holding cover means is supported directly by said support surface against said end surface of the connecting portion and said sealing ring affords sealing integrity between said connecting portion and said holding cover means,
said seal ring being dimensioned solely for sealing without acting as a structural member supporting said holding cover means.

20. A motor vehicle fuel tank comprising:
a tank body having a tank wall, the tank wall having an opening therein,
a thermoplastic connecting portion on the tank wall extending around and away from the opening, the connecting portion including a radially outwardly extending flange portion and end surface, the end surface extending over the flange portion and including a continuous groove;
a holding cover fitted against the end surface overlapping onto the flange portion and closing the opening;
an element held in communication with the opening by the holding cover;
a sealing ring operatively interposed between the connecting portion and the holding cover in the groove; and a divided ring having an inwardly directed projection portion engaging behind said flange portion of the connecting portion and having an outer periphery with an external screw thread;

wherein cross-sections of the groove and the sealing ring are so selected that in an operative position closing the connecting portion and the opening, the holding cover bears directly against and is supported directly by the end surface of the connecting portion;

said seal ring being dimensioned solely for sealing without acting as a structural member supporting said holding cover means.

* * * * *